United States Patent
Duret et al.

(10) Patent No.: US 6,941,254 B2
(45) Date of Patent: Sep. 6, 2005

(54) METHOD AND SYSTEM INTENDED FOR REAL-TIME ESTIMATION OF THE FLOW MODE OF A MULTIPHASE FLUID STREAM AT ALL POINTS OF A PIPE

(75) Inventors: Emmanuel Duret, Rueil-Malmaison (FR); Eric Heintze, Meudon (FR); Isabelle Rey-Fabret, Versailles (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 839 days.

(21) Appl. No.: 09/899,039

(22) Filed: Jul. 6, 2001

(65) Prior Publication Data

US 2002/0016701 A1 Feb. 7, 2002

(30) Foreign Application Priority Data

Jul. 27, 2000 (FR) .......................................... 00 09889

(51) Int. Cl.[7] ................................................ G06F 7/48
(52) U.S. Cl. .................... 703/9; 703/2; 706/25; 706/26; 706/44
(58) Field of Search .................. 123/25 A; 73/861.356; 703/2, 9; 706/15, 16, 25, 26, 44

(56) References Cited

U.S. PATENT DOCUMENTS

| | | | |
|---|---|---|---|
| 4,683,759 A | * 8/1987 | Skarsvaag et al. ........ | 73/861.04 |
| 5,226,092 A | * 7/1993 | Chen .......................... | 382/157 |
| 5,313,559 A | * 5/1994 | Ogata et al. .................. | 706/25 |
| 5,550,761 A | * 8/1996 | Pauchon et al. ............... | 703/9 |
| 5,741,980 A | * 4/1998 | Hill et al. ................. | 73/861.04 |
| 5,960,187 A | * 9/1999 | Faille et al. .................... | 703/12 |
| 6,028,992 A | * 2/2000 | Henriot et al. ................. | 703/9 |
| 6,505,579 B1 | * 1/2003 | Lee .......................... | 123/25 A |
| 6,654,697 B1 | * 11/2003 | Eryurek et al. ................ | 702/47 |
| 6,758,102 B2 | * 7/2004 | Henry et al. ........... | 73/861.356 |
| 6,823,296 B2 | * 11/2004 | Rey-Fabret et al. ........... | 703/2 |
| 2002/0082815 A1 | * 6/2002 | Rey-Fabret et al. ........... | 703/9 |

OTHER PUBLICATIONS

Albusaidi et al., Measurement of Multiple Velocities in Multiphase Flow, IEE Colloquium on Advances in Sensors for Fluid Flow Measurement, Apr. 1996, pp. 12/1–4.*
Chang, Modelling of EHD Gas–Liquid Two–Phase Pipe Flow, 12th Int. Conference on Conduction and Breakdown in Dielectric Liquids, Jul. 1996, pp. 468–471.*

(Continued)

*Primary Examiner*—Russell Frejd
(74) *Attorney, Agent, or Firm*—Antonelli, Terry, Stout & Kraus, LLP

(57) ABSTRACT

The invention is a method and system for real-time estimation of the flow mode, at all points of a pipe whose structure is defined by a certain number of structure parameters, of a multiphase fluid stream defined by several physical quantities providing simplified implementation of hydrodynamic modules that can be integrated in modelling tools. A non-linear neural network is formed with an input layer having as many inputs as there are structure parameters and physical quantities, an output layer with as many outputs as there are quantities necessary for estimation of the flow mode and at least one intermediate layer. A learning base is created with predetermined tables connecting various values obtained for the output data to the corresponding values of the input data, with iterative determination of the weighting factors of the activation function allowing to properly connect the values in the input and output data tables. In order to avoid singularities of the network output data likely to distort the determination of the weighting factors, a sorting procedure is used to eliminate non-pertinent data. The main advantages of the method are: modelling simplification and time saving.

14 Claims, 1 Drawing Sheet

Input layer
10 neurons

Hidden layer
$N_c$ neurons

Output layer
2 neurons

OTHER PUBLICATIONS

Chang, Stratified Gas–Liquid Two–Phase Electrohydrodynamics in Horizontal Pipe Flow, IEEE Transactions on Industry Applications, vol. 25, No. 2, Mar.–Apr. 1989, pp. 241–247.*

Terekhov et al., Intensification of Heat Transfer at Laminar Stabilized Flow of Vapour–Droplets in a Tube, IEEE, 3rd Russian Int. Symposium on Science and Technology, vol. 1, Jun. 1999, pp. 70–73.*

* cited by examiner

Input layer
10
neurons

Hidden layer
$N_c$ neurons

Output layer
2
neurons

METHOD AND SYSTEM INTENDED FOR REAL-TIME ESTIMATION OF THE FLOW MODE OF A MULTIPHASE FLUID STREAM AT ALL POINTS OF A PIPE

BACKGROUND OF THE INVENTION

1. Field of the Invention

The present invention relates to a method and to a system intended for real-time estimation of the flow mode of a multiphase fluid stream at all points of a pipe, comprising using neural networks.

2. Description of the Prior Art

Transporting hydrocarbons from production sites to treating plants constitutes an important link in the petroleum chain. It is a delicate link because of the complex interactions between the phases forming the transported effluents. The basic objective for operators is to reach an optimum productivity under the best safety conditions. The operator therefore have to control as best they can the velocity and the temperature so as to avoid unnecessary pressure drops, unwanted deposits and unsteady flows. The method that is generally used is to model in the best possible way the transportation of complex multiphase streams so as to provide at all times an image of the flows in the various parts of the production chain, by taking into account the precise constitution of the effluent, the flow rates, the pressures and the flow modes.

There are currently various software tools for simulating the transport of complex multiphase streams, allowing the design of suitable production equipments at an early stage.

U.S. Pat. No. 5,550,781, French Patent 2,756,004 (U.S. Pat. No. 6,028,992) and French Patent 2,756,045 (U.S. Pat. No. 5,960,187) filed by the assignee notably describe modelling methods and tools allowing simulation of the transport of complex multiphase streams for steady of transient flow and capable of accounting for instability phenomena that occur because of the irregular geometry of the formation crossed by the pipe or of the topography thereof, which is referred to by specialists as "terrain slugging" or "severe slugging".

The simulation tools are as complex as the modelled phenomena. Precision and performance can only be obtained after a relatively long modelling time, which is not really compatible with real-time management. That is the reason why these modelling tools cannot be used as they are for real-time management of the production. It therefore appears necessary to use modelling methods offering a good compromise between calculating speed and accuracy of results.

Neural networks define a data processing mode simulating the functioning of biological neuron systems. In such networks, an element carries out a relatively simple calculation such as a weighted sum of the signals present at its inputs applied to a non-linear function, which determines the state of its output. A large number of such elements interconnected in series and in parallel is used. Proper selection of the weighting factors allows the network to carry out complex functions. Networks known as retropropagation networks for example use multiple layers of elements defined above. Adaptation of such a network to a precise task is done by "training" the network with a certain number of examples and by adjusting the weighting factors for each element to the suitable values. Input values are presented to the network, the output value produced by the network is analyzed and the weighting factors are modified to best minimize the difference between the effective value at the output and the expected value in the selected example. After a sufficient training period, the network is sulted to respond to new input values for which the output value is not known a priorl and to produce a sultable output value. In its principle, a neural network works according to a non-linear regression method which is all the more effective in relation to conventional methods.

Such networks are used in many fields such as image recognition, solution of optimization problems, etc. initially, the neural network is a method suited for automatic classification, hence its use in particular for pattern recognition. For these applications, two types of networks can be used, the MLP (Multi Layer Perceptron) or the Kohonen networks, well-known to specialists.

The prior art in the field of neural networks is illustrated by the following references:

Dreyfus G., <<Les réseaux de neurones>>; Mécanique Industrielle et Matérlaux, n 51, September 98, Lippman R.P., An Introduction to Computing with Neural Nets; IEEE ASSP Magazine, April 1987 or Pinkus A., Approximation Theory of the MLP Model in Neural Networks; Acta Numerica 1999.

Networks are now also used for non-linear modelling of static data or of dynamic processes. The MLP networks are mostly used in this case. This approach currently concerns fields of application such as, for example, anomaly detection or stock-exchange prediction.

An example of use of neural networks is described for example in French Patent 2,786,568 filed by the assignee.

SUMMARY OF THE INVENTION

In the context of production management, the phenomena to be modelled in real time are highly non-linear and the parameters involved in the modelling procedure are numerous.

The invention is a method allowing, alone or in parallel with the aforementioned modelling methods, real-time management of the parameters of a fluid circulation by using neural networks.

The invention is a method for real-time estimation of the flow mode, at all points of a pipe whose structure can be defined by a certain number of structure parameters, of a multiphase fluid stream defined by several physical quantities and comprising at least a liquid phase and at least a gas phase, whereas modelling of the flow mode comprises:

forming a non-linear neural network with an input layer having as many inputs as there are structure parameters and physical quantities, an output layer having as many outputs as there are quantities necessary for estimation of the flow mode and at least one intermediate layer;

creating a learning base with predetermined tables connecting various values obtained for the output data to the corresponding values of the input data; and determining by iterations weighting factors of the activation function allowing proper connection of the values in the input and output data tables.

The method also preferably comprises an analysis of the output data of the neural network allowing to sort, among the values of the output data of the neural network, only the pertinent data to be taken into account for iterative determination of the weighting coefficients of the activation function.

A neural network expresses a continuous mathematical function between input and output data. As it continuously produces results through direct calculations that permanently connect input and output data, the discontinuities linked with the solution of systems of equations are consequently avoided, hence an appreciable time saving and simplified results. The non-linear nature of the activation functions of neural networks makes them perfectly suited for modelling of non-linear systems.

The method comprises for example forming a totally connected network and using linear output neurons.

An identity function is for example selected as the activation function.

The system according to the invention allows real-time estimation of the flow mode, at all points of a pipe whose structure can be defined by a certain number of structure parameters, of a multiphase fluid stream defined by several physical quantities and comprising at least a liquid phase and at least a gas phase. It comprises:

means for determining characteristics of a non-linear neural network with an input layer having as many inputs as there are structure parameters and physical quantities, an output layer having as many outputs as there are quantities necessary for estimation of the flow mode and at least one intermediate layer;

means for storing a learning base with predetermined tables connecting various values obtained for the output data to the corresponding values of the input data; and means for determining by iterations weighting factors of an activation function allowing proper connection of the values in the input and output data tables.

The system preferably comprises means for analyzing output data of the neural network allowing to sort, among the values of the output data of the neural network, only the pertinent data to be taken into account for iterative determination of the weighting coefficients of the activation function.

The system of this technique can be used for example in place of a tool developed with a conventional technique (and therefore relatively slow) in order to provide results compatible with real-time stream management. The terms of this implementation are developed hereafter.

BRIEF DESCRIPTION OF THE DRAWINGS

Other features of the method according to the invention will be clear from reading the description hereafter, with reference to the accompanying drawings wherein.

DETAILED DESCRIPTION OF THE INVENTION

1) Context

A circulation of multiphase fluids is considered in a pipe with at least a liquid phase and at least a gas phase, and forming a neural network is attempted allowing, from a certain number of geometrical and physical input data relative to the pipe and of physical data relative to the fluids, to give instantly, for each section of the fluid stream, an estimation of the flow mode.

2) Input and output data

The input data are for example:

geometrical data of the network: diameter, roughness and angle of inclination of the pipe, input data qualifying the effluents: density of the gas, density of the liquid, viscosity of the gas, viscosity of the liquid, etc.;

input data characterizing the mixture: gas/liquid surface tension, volume fraction of gas, barycentric velocity of the mixture.

The data that the network will evaluate and deliver at two main outputs are:

dV, the velocity difference between gas and liquid, and $\beta$, the stratified flow fraction in the pipe section where the flow type is to be determined; $\beta \in [0;1]$.

Other quantities qualifying the flow type can be calculated from these two outputs.

3) Structure of the network

In order to connect the input data to the output data, a preferably MLP type neural network, well-known to the man skilled in the art, is formed since it is particularly well-suited for physical phenomena modelling. In fact, its structure allows describing the dynamic as well as the static components of the phenomena, even by fixing, if necessary, some of its parameters at a reified value, therefore physically representative. Thus, in the example, knowing physical equations that govern the flows allows enriching the network and to best adapt it to the physical phenomena modelled thereby.

Figure 1:
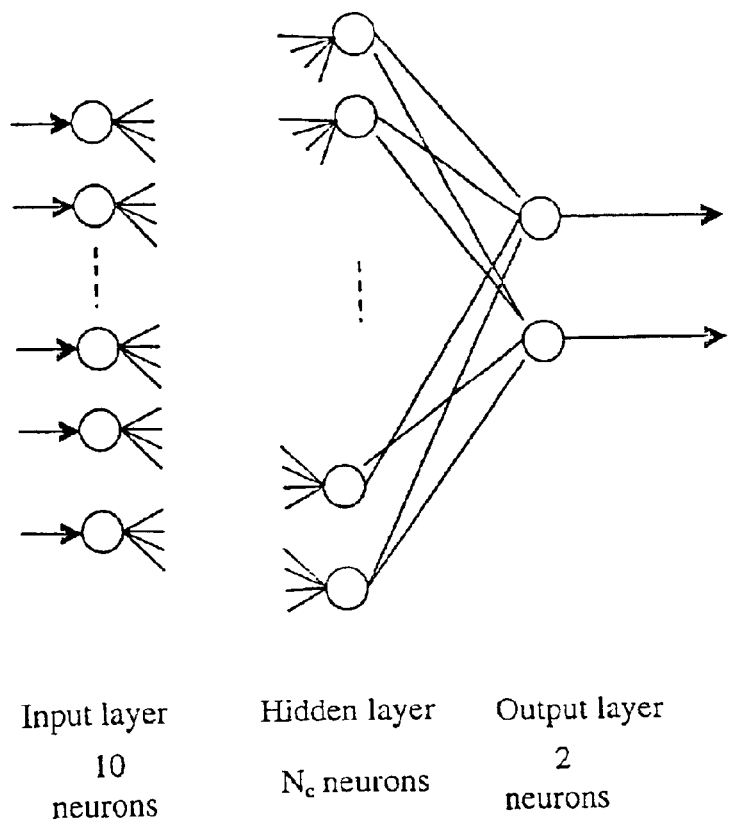
FIG. 1 shows an example of a neural network formed to connect hydrodynamic input data to output data relative to flow modes.

The neural network comprises (FIG. 1) three layers: the input layer having ten neurons corresponding to the ten data (mentioned above) of the complete physical model, an output layer having two neurons corresponding to the two parameters dV and $\beta$ sought, and an intermediate layer, referred to as hidden layer, whose number of neurons $N_o$ is optimized. The network is totally connected. The non-linearity of this network is obtained by a sigmoid activation function governing the behavior of the neurons in the hidden layer. The neurons of the output layer can be selected linear or non-linear. The activation function can be the identity function for example.

4) Learning: principle and implementation in the example a) Principle

The weights of this structure are determined at the end of a learning stage; this stage supplies the network with a set of data forming the learning base of the network, and in optimizing the weights of the network by minimizing the errors noted for all the samples of the base, between the output data resulting from network calculations and the data expected at the output, given by the base. The errors can be the absolute errors between the input and output quantities or the relative errors, according to the performance desired for the network.

The generalization powers of the network are then tested from its capacity to properly calculate the two outputs for inputs that are unknown thereto.

Implementation

In practice, besides the difficulty in selecting the various elements making up the network, the implementation of the network requires an extensive analysis of the data that make up the learning base. In fact, even if a network is properly elaborated for a given problem, it can give bad results insofar as the learning base that it is supplied with contains elements that disturb the optimization of all its weights. In the particular case of fluid flows, the problem is crucial; in fact, flow mode calculations carried out from complete and precise models generate a highly inhomogeneous database: for example, a result indicating a stratified flow can be "drowned" in neighboring points representing a dispersed flow; this point therefore corresponds to either a physical phenomenon that the neural network must be able to find or a "singleton" that the network has to smooth on the contrary in order to ensure the continuity of the result. The difficulty of prior data analysis thus lies in the determination of the nature of such points and, on a larger scale, of the various points of the base.

A method intended for a posteriori analysis of the network has therefore been elaborated, which identifies and distinguishes the available data representing the particular physical phenomena to be modelled from the calculation results to be ignored. This method produces "compacts" around each singular point considered in the n-dimensional space of the inputs (n=10 in the example described) in order to evaluate the degree of isolation of their behavior; thus, the singular points and the non-singular points are counted for each "ball" created, the proportion of singular points in the compact giving then a measure of their isolation. The terms "compact" and "ball" are taken in the topological sense of the word.

Figure 2:
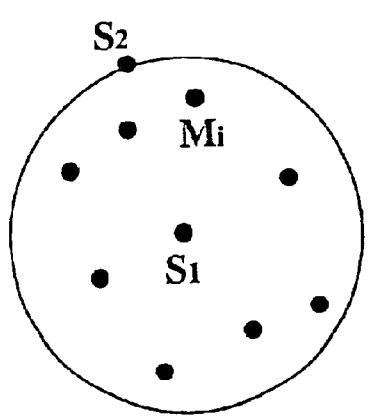
FIGS. 2 and 3 illustrate two different topological neighbourhood cases leading to a different qualification of output data in a validation process of the neural network.
Figure 3:
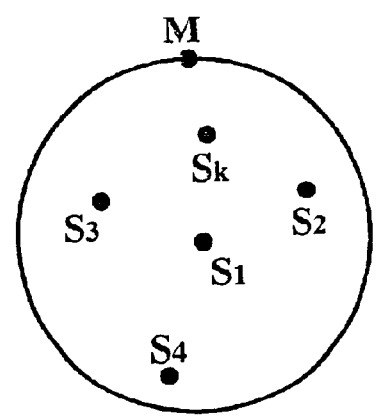

Thus, point S1 in FIG. 2, which is at the center of a ball and separated from the nearest singular point S2 by a neighborhood of many regular points Ml, can be considered to be singleton and thus regularized. On the other hand, the immediate neighborhood of point S1 in FIG. 3 has one or more singular points S2, S3, . . . Sk. In such a case, one must consider that points S1 to Sk are the expression of a particular physical phenomenon that has to be taken into account by means of an adaptation of the neural network.

This selection method allows identification of the necessary points for informing the network sufficiently during the learning stage. The suitable point base thus formed can then give information thereto so as to best optimize its parameters.

5) Results

The tools and the methods described above allow obtaining:

- a database cleared of any point with an abnormal behavior and containing only the information-rich points so as to best define the physical system to be identified,
- a network capable of interpolating the various flow types encountered so as to no longer generate any discontinuity, and also capable of taking into account the particular physical phenomena to be modelled despite their atypical behavior, and finally
- a tool giving a real-time estimation of the main hydrodynamic information.

What is claimed is:

1. A method of real-time estimation of a flow mode, at all points of a pipe whose structure can be defined by structural parameters, of a multiphase fluid stream defined by physical quantities and comprising at least a liquid phase and at least a gas phase, the method comprising:

forming a non-linear neural network with an input layer having as many inputs as there are structural parameters and physical quantities, an output layer with as many outputs as there are quantities necessary for estimation of the flow mode and at least one intermediate layer;

creating a learning base with predetermined tables connecting values obtained for the output data to corresponding values of the input data;

determining by iterations weighting factors of activation function allowing connection of the values in input and output data table, determining at least a velocity difference between gas and liquid and a stratified flow fraction with the neural network defined by the weighting factor; and estimating the flow mode from at least the velocity difference and the stratified flow fraction.

2. A method as claimed in claim 1, further comprising:

analyzing the output data of the neural network to allow sorting, among the values of the output data of the neural network, only data to be taken into account in the iterative determination of weighting coefficients of the activation function.

3. A method as claimed in claim 1, wherein:

a totally connected network is formed.

4. A method as claimed in claim 1, wherein:

output neurons are linear.

5. A method as claimed in claim 1, wherein:

the activation function is an identity function.

6. A method as claimed in claim 2, wherein:

a totally connected network is formed.

7. A method as claimed in claim 2, wherein:

output neurons are linear.

8. A method as claimed in claim 3, wherein:

output neurons are linear.

9. A method as claimed in claim 6, wherein:

output neurons are linear.

10. A method as claimed in claim 2, wherein:

the activation function is an identity function.

11. A method as claimed in claim 3, wherein:

the activation function is an identity function.

12. A method as claimed in claim 6, wherein:

the activation function is an identity function.

13. A system providing real-time estimation of a flow mode, at all points of a pipe whose structure can be defined by structural parameters, of a multiphase fluid stream defined by physical quantities and comprising at least a liquid phase and at least a gas phase, the system comprising:

means for determining characteristics of a non-linear neural network with an input layer having as many inputs as there are structural parameters and physical quantities, an output layer having as many outputs as there are quantities necessary for estimation of the flow mode and at least one intermediate layer;

means for storing a learning base with predetermined tables connecting values obtained for the output data to corresponding values of the input data;

means for determining by iterations weighting factors of an activation function allowing connection of the values in input and output data table, means for determining at least a velocity difference between gas and liquid and a stratified flow fraction with the neural network defined by the weighting factors; and means for estimating the flow mode from at least the velocity difference and the stratified flow fraction.

14. A system as claimed in claim 13, comprising: means for analyzing the output data of the neural network allowing sorting, among the values of the neural network, only data to be taken into account in the iterative determination of weighting coefficients of the activation function.

* * * * *